(12) United States Patent
Wai

(10) Patent No.: US 11,074,622 B2
(45) Date of Patent: *Jul. 27, 2021

(54) REAL-TIME PREDICTIVE RECOMMENDATION SYSTEM USING PER-SET OPTIMIZATION

(71) Applicant: Groupon, Inc., Chicago, IL (US)

(72) Inventor: Lawrence Lee Wai, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,948

(22) Filed: Oct. 31, 2019

(65) Prior Publication Data

US 2020/0143429 A1    May 7, 2020

Related U.S. Application Data

(63) Continuation of application No. 14/709,296, filed on May 11, 2015, now Pat. No. 10,497,025.

(60) Provisional application No. 61/993,982, filed on May 15, 2014.

(51) Int. Cl.
*G06Q 30/02* (2012.01)

(52) U.S. Cl.
CPC ..... *G06Q 30/0269* (2013.01); *G06Q 30/0244* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2005/0021397 A1* | 1/2005 | Cui | .................... | G06Q 30/0251 705/14.42 |
| 2008/0154878 A1* | 6/2008 | Rose | ................... | G06F 16/9535 |
| 2010/0030647 A1* | 2/2010 | Shahshahani | ...... | G06Q 30/0269 705/14.66 |
| 2011/0010371 A1* | 1/2011 | Xu | ......................... | G06Q 10/10 707/749 |
| 2013/0077820 A1 | 3/2013 | Marais et al. | | |

OTHER PUBLICATIONS

U.S. Appl. No. 14/709,296, filed May 11, 2015, U.S. Pat. No. 10,497,025, Issued.

* cited by examiner

*Primary Examiner* — Vincent M Cao
(74) *Attorney, Agent, or Firm* — Alston & Bird LLP

(57) ABSTRACT

In general, embodiments of the present invention provide systems, methods and computer readable media configured to use a per-set level optimization of the rank order of promotions to be recommended to a consumer. In some embodiments, machine learning is used offline to generate a predictive diversity model that receives one or more similarity rank features associated with a promotion (e.g., category, price band) as input, and produces an output multiplier to be applied to the promotion's respective associated relevance score (e.g., a relevance score representing a prediction of the promotion's conversion rate without diversity features). At run time, per-set optimization of the ordering of a set of promotions is implemented by adjusting the respective associated relevance scores of the promotions using the diversity model and then re-ordering the set of promotions based on their respective adjusted relevance scores.

18 Claims, 4 Drawing Sheets

REAL-TIME PREDICTIVE RECOMMENDATION SYSTEM USING PER-SET OPTIMIZATION

CROSS-REFERENCE TO RELATED APPLICATIONS

This application is a continuation of U.S. application Ser. No. 14/709,296, titled "REAL-TIME PREDICTIVE RECOMMENDATION SYSTEM USING PER-SET OPTIMIZATION," filed May 11, 2015, which claims the benefit of U.S. Provisional Application No. 61/993,982, entitled "REAL-TIME PREDICTIVE RECOMMENDATION SYSTEM USING PER-SET OPTIMIZATION," and filed May 15, 2014, the contents of which are hereby incorporated by reference herein in their entirety.

FIELD

Embodiments of the invention relate, generally, to a real-time predictive recommendation system for promotions using a per-set optimization of promotion rankings determined by predictive models generated from relevance data sources.

BACKGROUND

Current methods for recommending promotions to consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

The capability to recommend promotions for purchase that are most relevant to each consumer is important for a promotion and marketing service, because maintaining an active and engaged customer base means maximizing profits. In some embodiments, a relevance system is used to select promotions to be recommended to a consumer (i.e., the available promotions that are most relevant to the consumer) based on using stored data representing attributes of promotions and/or the consumer, and is performed by executing a workflow that specifies a sequence of filtering rules and/or algorithms to be applied in selecting the relevant promotions. In some embodiments, the promotions selected for recommendation to consumers are ranked based on predictions of promotion performance and consumer behavior. The top-ranked promotions may be featured in a presentation to the consumer.

In some embodiments, each of a set of available promotions to be recommended to a particular consumer can be sorted and/or ranked according to a probability that the consumer's behavior in response to the promotion will match a ranking target (e.g., conversion rate, gross revenue). In some embodiments, promotions available to a consumer are ranked based on a relevance model derived from one or more data sources representing attributes of promotions and consumer behavior. Using the model, each promotion is associated with a relevance score that represents the probability that the consumer's behavior with respect to the promotion will approach the ranking target while the consumer interacts with an impression containing content describing the promotion. In some embodiments, the set of promotions selected for recommendation to a consumer can be sorted and/or ranked based on their respective associated relevance scores.

In embodiments, the relevance model may be a predictive function. In some embodiments, the predictive function may be a trainable function that is developed using machine learning. In some embodiments, the predictive function may be generated offline using supervised learning in a set of modeling stages in which the function is adapted based on training data sets of features that are extracted from a set of data sources (e.g., log data, promotion and user attribute data). In some embodiments, the set of data sources includes contextual data sources. In embodiments, examples of contextual data sources for mobile consumers may include user locations (prior, current, or potential) and their associated categories of interest; prior promotion interest level shown by the consumer; and prior promotion subcategory interest level.

Ranking promotions based on their respective attributes may not be the only factor to consider when ordering promotions for presentation to a consumer. The arrangement of promotions within the context of a presentation may be a factor in determining the ordering of a set of relevant promotions to be recommended for a consumer. Ranking promotions based on individual attributes often results in clumping of most similar promotions, so a presentation of recommended promotions based on their rank order may show sequences of very similar types of promotions (e.g., the featured restaurants in a returned set of recommended restaurants may include too many sushi restaurants and not enough of other types of restaurants). Thus, in embodiments, the rank ordering of promotions to be recommended to a consumer may be optimized at the per-set level, i.e., optimized based on promotion features of a set of promotions with which a particular promotion is associated. In some embodiments, per-set optimization of rank ordering is implemented using a predictive model that is generated by applying machine learning to map one or more per-set features associated with a promotion to a multiplier that is a predictor of the effect of the feature values on the ranking of the promotion.

Predictive modeling at the per set level is more challenging than predictive modeling at the per item level for reasons including:
  analysis features are more complex because they are in general dependent upon the arrangement of items, which grows extremely quickly as the number of items increases (faster than exponential)
  training data becomes very sparse because of the large number of potential set configurations One example of per-set optimization of the rank ordering of recommended promotions is per-set optimization for diversity. It has been demonstrated that a consumer is more likely to remain active and engaged if there is more diversity in recommendation results (e.g., in reference to the restaurant example, adding a relevant restaurant from another category before or after sushi restaurants to spice things up).

At a high level, the diversity of a set of promotions will be the perceived diversity as the consumer scrolls through the results. At any point in time during the consumer session, the perceived diversity will be greater if the current promotion being viewed and the neighboring promotions are as dissimilar as possible, e.g., if the current promotion is a restaurant promotion, then the preceding and following promotions should be different, e.g., leisure activity preceding and health following.

As such, and according to some example embodiments, the systems and methods described herein are therefore configured to use a per-set level optimization of the rank order of promotions to be recommended to a consumer. In some embodiments, machine learning is used offline to generate a predictive diversity model that receives one or more similarity rank features associated with a promotion (e.g., category, price band) as input, and produces an output multiplier to be applied to the promotion's respective associated relevance score (e.g., a relevance score representing a prediction of the promotion's conversion rate without diversity features). At run time, per-set optimization of the ordering of a set of promotions is implemented by adjusting the respective associated relevance scores of the promotions using the diversity model and then re-ordering the set of promotions based on their respective adjusted relevance scores.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
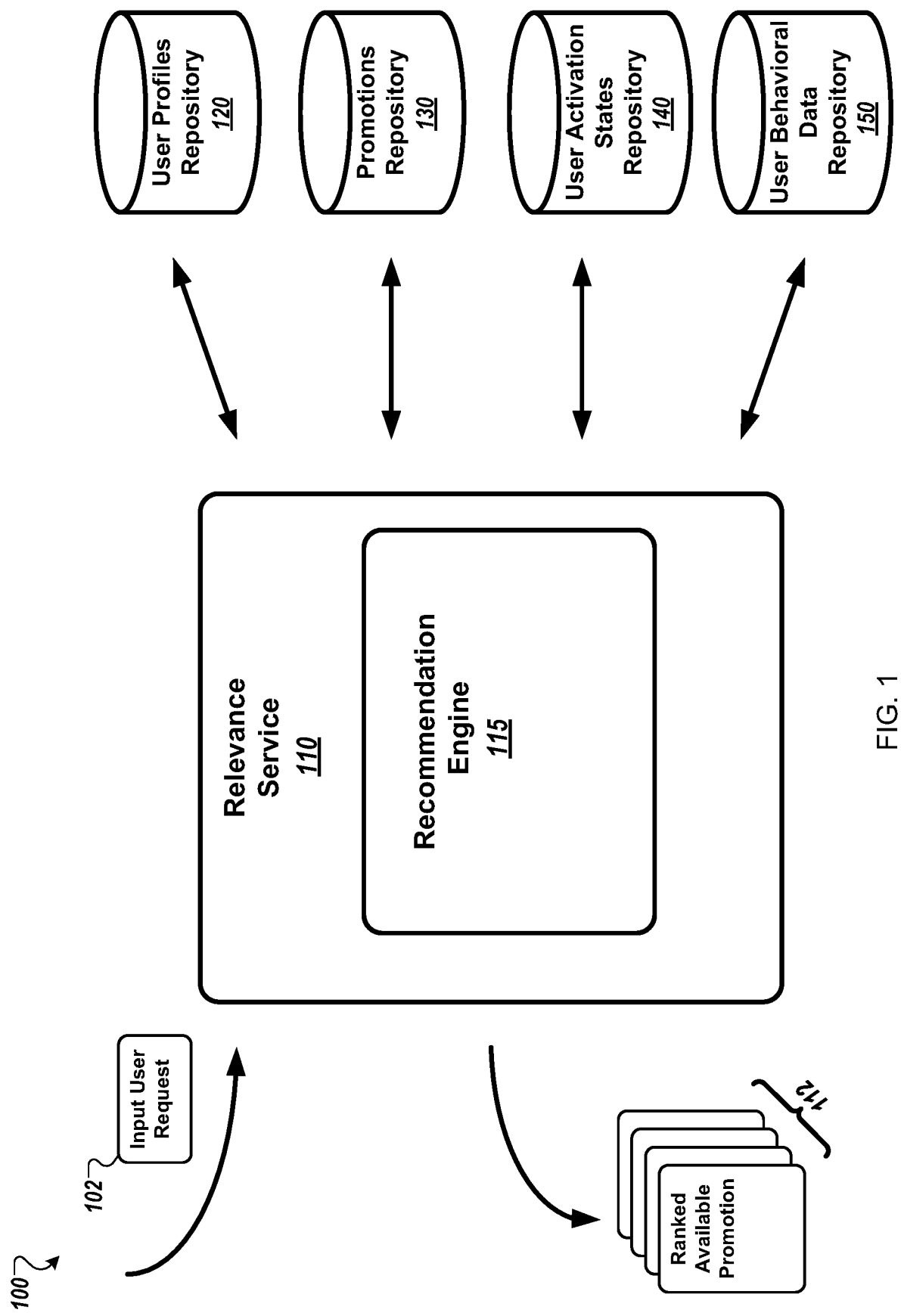
FIG. 1 illustrates an example system that can be configured to implement the relevance ranking of promotions that are available from a promotion and marketing service and are to be recommended to a particular consumer in accordance with some embodiments discussed herein.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

FIG. 1 illustrates an example system 100 that can be configured to implement the relevance ranking of promotions that are available from a promotion and marketing service and are to be recommended to a particular consumer (i.e., "user"). System 100 comprises a relevance service 110 that returns a set of available promotions 112 that are ranked for relevance to a consumer in response to receiving a request 102 for available promotions on behalf of the consumer; a user profiles repository 120 in which data representing profile attributes of consumers are stored; a promotions repository 130 in which data representing attributes of promotions are stored; a user activation states repository 140 in which data representing consumer activation states respectively associated with consumers are stored; and a user behavioral data repository 150 in which historical data representing the respective consumer behavior of consumers are stored. The relevance service 110 includes a recommendation engine 115 that is configured to select available promotions to be recommended to a particular consumer.

In some embodiments, recommendation engine 115 generates a set of available promotions that are most relevant to a consumer in response to receiving consumer identification data representing the consumer. In some embodiments, generating the set of available promotions includes selecting the promotions using stored data representing attributes of promotions and/or the consumer, and is performed by executing a workflow that specifies a sequence of filtering rules and/or algorithms to be applied in selecting the relevant promotions. A workflow may include ranking the selected promotions for relevance to the consumer and then ordering the selected promotions based on their respective rankings. In some embodiments, the most highly ranked promotions may be presented to the consumer as featured recommended promotions. In some embodiments, recommendation engine 115 may be configured to include per-set optimization of the ordering of the selected promotions.

Figure 2:
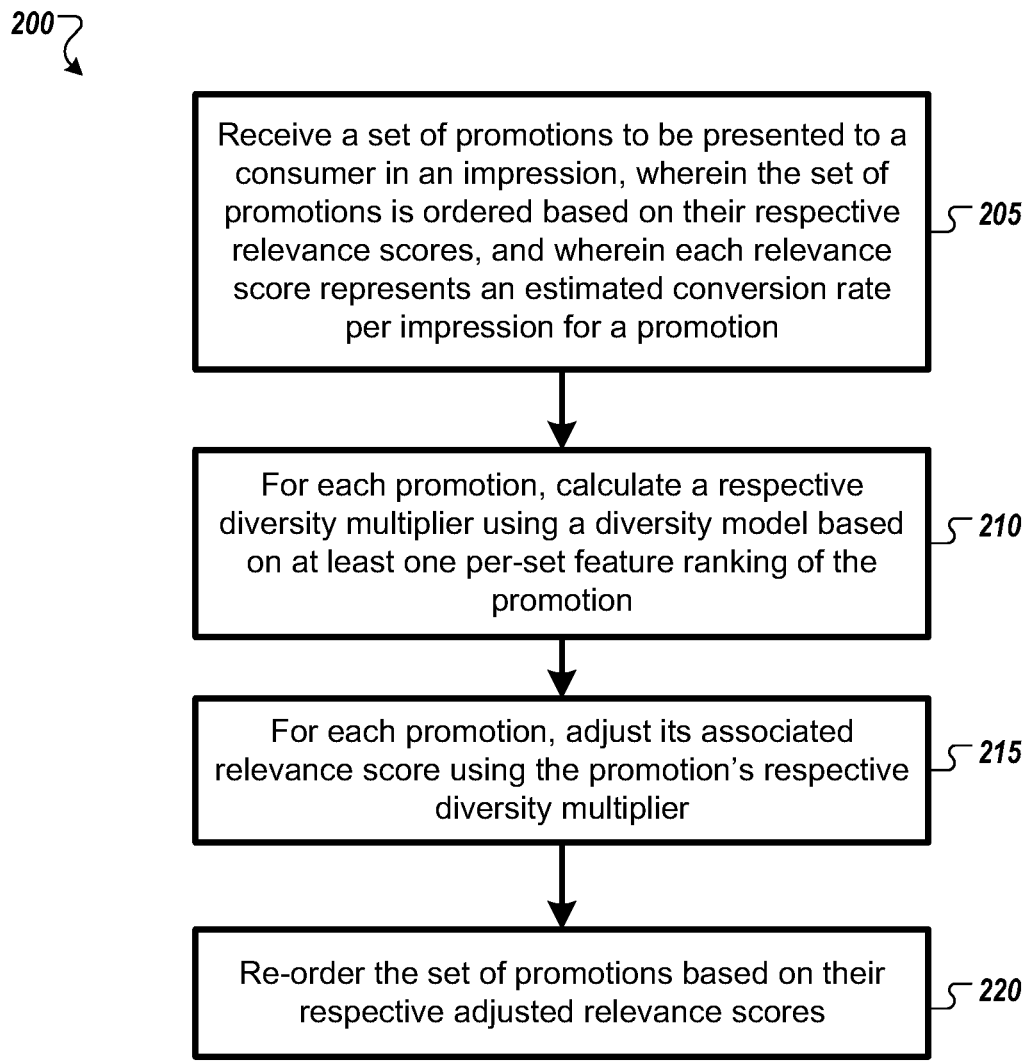
FIG. 2 is a flow diagram of an example method for per-set optimization of the rank order of a set of promotions to be recommended to a consumer in order to increase the diversity of the presentation of the promotions in accordance with some embodiments discussed herein.

FIG. 2 is a flow diagram of an example method 200 for per-set optimization of the rank order of a set of promotions to be recommended to a consumer in order to increase the diversity of the presentation of the promotions. For convenience, the method 200 will be described with respect to a system, including one or more computing devices, that performs the method 200. Specifically, the method 200 will be described with respect to its implementation by recommendation engine 115 in system 100.

In embodiments, the system receives 205 a set of promotions to be presented to a consumer in an impression. In some embodiments, the set of promotions is ordered based on their respective base relevance scores, each of which has been calculated based on the output of a predictive relevance model.

In some embodiments, the predictive relevance model can be generated offline using supervised learning. In a typical supervised learning scenario, a predictive function that maps an input value to one of a set of predefined output values is adapted, in response to exposure to a training data set containing examples of inputs and their respective associated outputs, to perform a mapping that represents a particular predictive model. In some embodiments, the predictive function maps data representing the promotion's performance and the consumer's behavior to one of a set of probability classes, each class representing a different probability that the data matches a ranking target.

In some embodiments, the relevance score associated with a promotion is calculated based on a predictive model for which the inputs are features that may represent attributes of the promotion and/or attributes of the consumer, and for which the ranking target is consumer conversion rate. In this case, the base relevance score calculated for a particular promotion using the predictive relevance model represents an estimated conversion rate per impression for the promotion.

In embodiments, the system calculates 210 a diversity multiplier for each of the set of promotions. In some embodiments, the diversity multiplier is calculated using a predictive diversity model that maps a feature set including one or more per-set features associated with a promotion to a diversity multiplier output representing the predicted effect of the feature set on the promotion's base relevance score (e.g., the effect of the diversity multiplier on the estimated conversion rate for the promotion).

In some embodiments, the predictive diversity model is generated offline using supervised learning. The selection of predictive model to generate is not critical to the invention; examples of predictive models include trainable functions (e.g., trainable classifiers), neural networks, and ensembles of trees. In embodiments, the per-set feature set may be chosen based on a statistical analysis to determine the most discriminant features to represent the modeling task. Examples of per-set features that may be used as input for a predictive diversity model include promotion category, price band, and location.

In some embodiments, the training data set from which the predictive diversity model is derived is generated from the same historical data from which the predictive relevance model is derived. The historical data represent consumer behavior and promotion performance collected from impressions previously presented to consumers. In embodiments in which the base relevance score represents estimated conversion rate, each training data set instance (representing a previously presented promotion) includes per-set input to the model generated by extracting per-set feature data describing the promotion and the target diversity multiplier output from that input, which is calculated by taking the ratio of the predicted base score for the promotion (estimated conversion rate calculated using the predictive relevance model) to the actual conversion rate that occurred. An example of historical data representing the effect of per-set feature data on estimated conversion rate will be discussed in more detail below with reference to chart 300 in FIG. 3.

In embodiments, the system adjusts 215 the base relevance score for each promotion using the promotion's respective diversity multiplier.

In embodiments, the system re-orders 220 the set of promotions based on their respective adjusted relevance scores. In some embodiments, the diversity of a set of recommended promotions is increased because the re-ordering based on the adjusted scores creates gaps in the clumps of similar promotions from the original ordering, and the gaps are filled by more highly-ranked dissimilar promotions.

Figure 3:
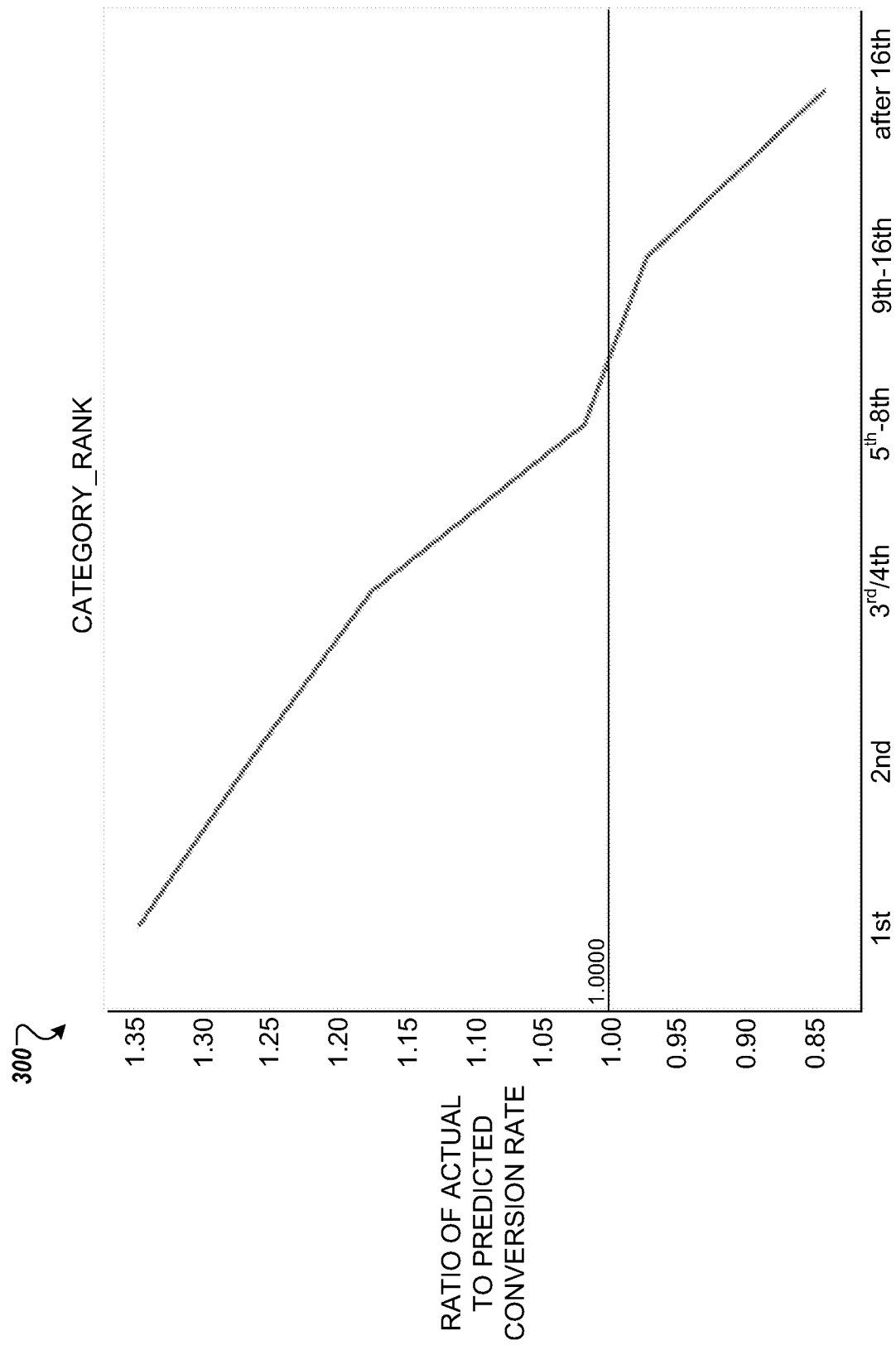
FIG. 3 is a chart illustrating the effect of per-set feature data on estimated conversion rate in accordance with some embodiments discussed herein.

FIG. 3 is a chart 300 illustrating the effect of per-set feature data on estimated conversion rate. The chart 300, based on historical data collected from promotions previously presented to consumers in impressions, depicts the ratio of the actual conversion rate over the predicted conversion rate as a function of the rank of a promotion within its category. If a promotion is the first to appear in its category, it has a 30% greater chance of being purchased than if it were to appear after 4 other promotions in the same category. Conversely, if the promotion appears after the consumer already has seen 16 promotions from the same category, it has a 50% lower chance of being purchased as compared to being the first to be seen. Similar effects are seen when comparing promotions in the same price band.

Figure 4:
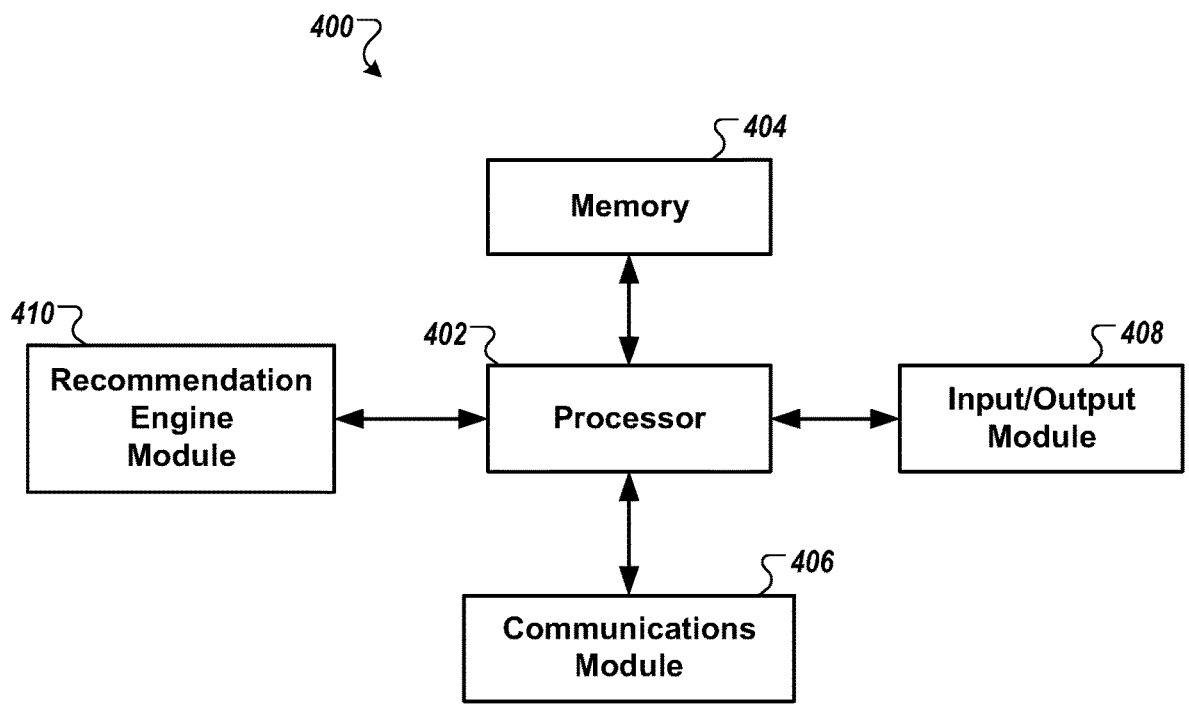
FIG. 4 illustrates a schematic block diagram of circuitry that can be included in a computing device, such as a recommendation engine, in accordance with some embodiments discussed herein.

FIG. 4 depicts a schematic block diagram of circuitry 400, some or all of which may be included in, for example, recommendation engine 115. As illustrated in FIG. 4, in accordance with some example embodiments, circuitry 400 can include various means, such as processor 402, memory 404, communications module 406, and/or input/output module 408. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. Alternatively, as another example, when processor 402 is embodied as an executor of instructions, such as may be stored in memory 404, the instructions may specifically configure processor 402 to perform one or more algorithms and operations described herein, such as those discussed in connection with FIG. 1.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data (including analytics data), applications, instructions, or the like for enabling circuitry 400 to carry out various functions in accordance with example embodiments of the present invention. For example, in at least some embodiments, memory 404 is configured to buffer input data for processing by processor 402. Additionally or alternatively, in at least some embodiments, memory 404 is configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user. Some example visual outputs that may be provided to a user by circuitry 400 are discussed in connection with FIG. 1. As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 408 may be reduced as compared to embodiments where circuitry 400 is implemented as an end-user machine or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400. Input/output module 408 may be in communication with the memory 404, communications module 406, and/or any other component(s), such as via a bus. Although more than one input/output module and/or other component can be included in circuitry 400, only one is shown in FIG. 4 to avoid overcomplicating the drawing (like the other components discussed herein).

Predictive recommendation engine module 410 may also or instead be included and configured to perform the functionality discussed herein related to the recommendation engine discussed above. In some embodiments, some or all of the functionality of predictive recommendation engine may be performed by processor 402. In this regard, the example processes and algorithms discussed herein can be performed by at least one processor 402 and/or predictive recommendation engine module 410. For example, non-transitory computer readable media can be configured to store firmware, one or more application programs, and/or other software, which include instructions and other computer-readable program code portions that can be executed to control each processor (e.g., processor 402 and/or predictive recommendation engine module 410) of the components of system 100 to implement various operations, including the examples shown above. As such, a series of computer-readable program code portions are embodied in one or more computer program products and can be used, with a computing device, server, and/or other programmable apparatus, to produce machine-implemented processes.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402 and/or predictive recommendation engine module 410 discussed above with reference to FIG. 4, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for per-set optimization of a rank order of a set of promotions to be recommended to a consumer, the method comprising:
calculating a diversity multiplier for a promotion in an ordered set of promotions based on a predictive diversity model and a diversity feature set associated with the ordered set of promotions, wherein the diversity multiplier represents an effect of the diversity feature set on likelihood of conversion of the promotion based on one or more attributes associated with the promotion;
calculating a relevance score for the promotion based on the diversity multiplier;
re-ordering the ordered set of promotions based on the relevance score for the promotion to generate a reordered set of promotions; and
transmitting a top N most highly ranked promotions from the reordered set of promotions based on respective relevance scores to a consumer device associated with the consumer.

2. The computer-implemented method of claim 1, wherein the calculating the diversity multiplier is based on at least one per-set promotion feature associated with the diversity feature set.

3. The computer-implemented method of claim 1, wherein the calculating the diversity multiplier is based on a dissimilarity between the promotion displayed on an electronic interface and one or more other promotions displayed on the electronic interface.

4. The computer-implemented method of claim 1, wherein the calculating the diversity multiplier is based on a predicted effect of the diversity feature set on an assigned base relevance score of the promotion.

5. The computer-implemented method of claim 1, wherein the calculating the diversity multiplier is based on at least one of a promotion category associated with the promotion, a price band associated with the promotion, and a location associated with the promotion.

6. The computer-implemented method of claim 1, wherein the computer-implemented method further comprises:
generating the predictive diversity model based on a supervised learning process.

7. The computer-implemented method of claim 1, wherein the computer-implemented method further comprises:
training the predictive diversity model based on historical data associated with a predictive relevance model that facilitates ordering of the ordered set of promotions.

8. A computer program product, stored on a computer readable medium, comprising instructions that when executed on one or more computers cause the one or more computers to perform operations implementing cross-sell promotions ranking, the operations comprising:
calculating a diversity multiplier for a promotion in an ordered set of promotions based on a predictive diversity model and a diversity feature set associated with the ordered set of promotions, wherein the diversity multiplier represents an effect of the diversity feature set on likelihood of conversion of the promotion based on one or more attributes associated with the promotion;
calculating a relevance score for the promotion based on the diversity multiplier;
re-ordering the ordered set of promotions based on the relevance score for the promotion to generate a reordered set of promotions; and
transmitting a top N most highly ranked promotions from the reordered set of promotions based on respective relevance scores to a consumer device associated with a consumer.

9. The computer program product of claim 8, wherein the calculating the diversity multiplier is based on at least one per-set promotion feature associated with the diversity feature set.

10. The computer program product of claim 8, wherein the calculating the diversity multiplier is based on a dissimilarity between the promotion displayed on an electronic interface and one or more other promotions displayed on the electronic interface.

11. The computer program product of claim 8, wherein the calculating the diversity multiplier is based on a predicted effect of the diversity feature set on an assigned base relevance score of the promotion.

12. The computer program product of claim 8, wherein the calculating the diversity multiplier is based on at least one of a promotion category associated with the promotion, a price band associated with the promotion, and a location associated with the promotion.

13. The computer program product of claim 8, wherein the operations further comprise:
generating the predictive diversity model based on a supervised learning process.

14. The computer program product of claim 8, wherein the operations further comprise:
training the predictive diversity model based on historical data associated with a predictive relevance model that facilitates ordering of the ordered set of promotions.

15. A system, comprising:
one or more computers and one or more storage devices storing instructions that are operable, when executed by the one or more computers, to cause the one or more computers to perform operations implementing per-set optimization of a rank order of a set of promotions to be recommended to a consumer, the operations comprising:
calculating a diversity multiplier for a promotion in an ordered set of promotions based on a predictive diversity model and a diversity feature set associated with the ordered set of promotions, wherein the diversity multiplier represents an effect of the diversity feature set on likelihood of conversion of the promotion based on one or more attributes associated with the promotion;
calculating a relevance score for the promotion based on the diversity multiplier;
re-ordering the ordered set of promotions based on the relevance score for the promotion to generate a reordered set of promotions; and
transmitting a top N most highly ranked promotions from the reordered set of promotions based on respective relevance scores to a consumer device associated with a consumer.

16. The system of claim 15, wherein the calculating the diversity multiplier is based on a dissimilarity between the promotion displayed on an electronic interface and one or more other promotions displayed on the electronic interface.

17. The system of claim 15, wherein the calculating the diversity multiplier is based on a predicted effect of the diversity feature set on an assigned base relevance score of the promotion.

18. The system of claim 15, wherein the calculating the diversity multiplier is based on at least one of a promotion category associated with the promotion, a price band associated with the promotion, and a location associated with the promotion.

\* \* \* \* \*